United States Patent
Saha et al.

(10) Patent No.: US 11,973,771 B2
(45) Date of Patent: Apr. 30, 2024

(54) SYSTEM AND METHOD FOR SECURITY IN INTERNET-OF-THINGS AND CYBER-PHYSICAL SYSTEMS BASED ON MACHINE LEARNING

(71) Applicant: The Trustees of Princeton University, Princeton, NJ (US)

(72) Inventors: Tanujay Saha, Princeton, NJ (US); Najwa Aaraj, Paris (FR); Niraj K. Jha, Princeton, NJ (US)

(73) Assignee: THE TRUSTEES OF PRINCETON UNIVERSITY, Princeton, NJ (US)

( * ) Notice: Subject to any disclaimer, the term of this patent is extended or adjusted under 35 U.S.C. 154(b) by 374 days.

(21) Appl. No.: 17/603,453

(22) PCT Filed: Feb. 25, 2020

(86) PCT No.: PCT/US2020/019666
§ 371 (c)(1),
(2) Date: Oct. 13, 2021

(87) PCT Pub. No.: WO2020/219157
PCT Pub. Date: Oct. 29, 2020

(65) Prior Publication Data
US 2022/0201014 A1 Jun. 23, 2022

Related U.S. Application Data

(60) Provisional application No. 62/839,192, filed on Apr. 26, 2019.

(51) Int. Cl.
*H04L 29/06* (2006.01)
*G06F 18/214* (2023.01)
(Continued)

(52) U.S. Cl.
CPC ........ *H04L 63/1416* (2013.01); *G06F 18/214* (2023.01); *G06F 18/2411* (2023.01);
(Continued)

(58) Field of Classification Search
CPC ............. H04L 63/1425; H04L 63/1416; G06F 21/552
See application file for complete search history.

(56) References Cited

U.S. PATENT DOCUMENTS

| 9,183,387 B1 * | 11/2015 | Altman | ............... H04L 63/1425 |
| 10,044,751 B2 * | 8/2018 | Huston, III | ......... H04L 63/1441 |

(Continued)

FOREIGN PATENT DOCUMENTS

WO  00/70463 A1  11/2000

OTHER PUBLICATIONS

International Search Report and Written Opinion for corresponding PCT Application No. PCT/US2020/019666, dated May 1, 2020.
(Continued)

*Primary Examiner* — Dao Q Ho
(74) *Attorney, Agent, or Firm* — MEAGHER EMANUEL LAKS GOLDBERG & LIAO, LLP

(57) ABSTRACT

According to various embodiments, a method for detecting security vulnerabilities in at least one of cyber-physical systems (CPSs) and Internet of Things (IoT) devices is disclosed. The method includes constructing an attack directed acyclic graph (DAG) from a plurality of regular expressions, where each regular expression corresponds to control-data flow for a known CPS/IoT attack. The method further includes performing a linear search on the attack DAG to determine unexploited CPS/IoT attack vectors, where a path in the attack DAG that does not represent a known CPS/IoT attack vector represents an unexploited CPS/IoT attack vector. The method also includes applying a trained machine learning module to the attack DAG to
(Continued)

predict new CPS/IoT vulnerability exploits. The method further includes constructing a defense DAG configured to protect against the known CPS/IoT attacks, the unexploited CPS/IoT attacks, and the new CPS/IoT vulnerability exploits.

27 Claims, 16 Drawing Sheets

(51) Int. Cl.
  *G06F 18/2411* (2023.01)
  *G06N 7/01* (2023.01)
  *G06N 20/00* (2019.01)
  *H04L 9/40* (2022.01)
(52) U.S. Cl.
  CPC ............... *G06N 7/01* (2023.01); *G06N 20/00* (2019.01); *H04L 63/1425* (2013.01); *H04L 63/1458* (2013.01)

(56) References Cited

U.S. PATENT DOCUMENTS

| | | | | |
|---|---|---|---|---|
| 2011/0078691 | A1* | 3/2011 | Yildiz | G06F 9/461 718/103 |
| 2015/0188935 | A1* | 7/2015 | Vasseur | H04W 12/12 726/23 |
| 2015/0381649 | A1* | 12/2015 | Schultz | G06Q 10/0635 726/25 |
| 2018/0218005 | A1* | 8/2018 | Kuhtz | G06F 8/71 |
| 2022/0070196 | A1* | 3/2022 | Sarkar | G06N 5/02 |
| 2022/0076164 | A1* | 3/2022 | Conort | G06N 20/00 |
| 2022/0201014 | A1* | 6/2022 | Saha | G06N 20/00 |

OTHER PUBLICATIONS

Aaraj et al., "Dynamic binary instrumentation-based framework for malware defense", Proc. Int. Conf. Detection of Intru-sions and Malware, and Vulnerability Assessment, pp. 64-87, 2008.
Akmandor et al., "Smart health care: An edge-side computing perspective", IEEE Consumer Electronics Magazine, vol. 7, No. 1, pp. 29-37, Jan. 2018.
Amiri et al., "Mutual information-based feature selection for intrusion detection systems", Journal of Network and Computer Applications, vol. 34, No. 4, pp. 1184-1199, 2011.
Åmes et al., "Using hidden markov models to evaluate the risks of intrusions", International Workshop on Recent Advances in Intrusion Detection, pp. 145-164, Springer, 2006.
Benferhat et al., "A naive bayes approach for detecting coordinated at tacks", 32nd Annual IEEE International Computer Software and Applications Conference, pp. 704-709, Jan. 2008.
Bilge et al., "Disclosure: detecting botnet command and control servers through large-scale netflow analysis", Proceedings of the 28th Annual Computer Security Applications Conference, pp. 129-138, Dec. 3-7, 2012.
Bilge et al., "Exposure: Finding malicious domains using passive DNS analysis", Ndss, pp. 1-17, 2011.
Bivens et al., "Network-based intrusion detection using neural networks", Intelligent Engineering Systems through Artificial Neural Networks, vol. 12, No. 1, pp. 579-584, 2002.
Blowers et al., "Machine learning applied to cyber operations", Network science and cybersecurity, pp. 155-175. Springer, 2014.
Cannady et al., "Artificial neural networks for misuse detection", Proc. Nat. Inf. Syst. Secur. Conf., pp. 443-456, 1998.
Chang et al., "LIBSVM: A library for support vector machines", ACM Trans. Intelligent Systems and Technology, 2:27:1-27:27, 2011.
Chen et al., "Efficient Gan-based method for cyber-intrusion detection", CoRR, arXiv:1904.02426v2, Jul. 24, 2019.
Gao et al., "A comprehensive detection of memory corruption vulnerabilities for c/c++ programs", 2018 IEEE Intl Conf on Parallel & Distributed Processing with Applications, Ubiquitous Computing & Communications, Big Data & Cloud Computing, Social Computing & Networking, Sustainable Computing & Communications, pp. 354-360, IEEE, 2018.
Gharibian et al., Comparative study of supervised machine learning techniques for intrusion detection. In Fifth Annual Conference on Communication Networks and Services Research (CNSR'07), pp. 350-358. IEEE, 2007.
Hendry et al., "Intrusion signature creation via clustering anomalies", Data Mining, Intrusion Detection, Information Assurance, and Data Networks Security 2008, vol. 6973, p. 69730C, International Society for Optics and Photonics, 2008.
Hunt et al., "The seven properties of highly secure devices", Tech. Rep. MSR-TR-2017-16, 2017.
Kocher et al., "Spectre attacks: Exploiting speculative execution", 2019 IEEE Symposium on Security and Privacy (SP), pp. 1-19. IEEE, 2019.
Kruegel et al., Using decision trees to improve signature-based intrusion detection. In International Workshop on Recent Advances in Intrusion Detection, pp. 173-191. Springer, 2003.
Li et al., "An efficient intrusion detection system based on support vector machines and gradually feature removal method", Expert Systems with Applications, vol. 39, No. 1, pp. 424-430, 2012.
Lipp et al., "Meltdown", arXiv:1801.01207v1, Jan. 3, 2018.
Meidan et al., "N-baIoT: Network-based detection of IoT botnet attacks using deep autoencoders", IEEE Pervasive Computing, vol. 17, No. 9, pp. 12-22, Jul.-Sep. 2018.
Department of Defense: Washington DC. Security requirements for automatic data processing (ADP) systems. DoD Directive 5200.28, Dec. 1972.
Department of Defense: Washington DC. Techniques and procedures for implementing deactivating testing and evaluating secure resource-sharing ADP systems. DoD 5200.28-M, Jan. 1973.
Sequeira et al., "Admit: anomaly-based data mining for intrusions", Proceedings of the eighth ACM SIGKDD international conference on Knowledge discovery and data mining, pp. 386-395, ACM, 2002.
Szekeres et al., "Sok: Eternal war in memory", 2013 IEEE Symposium on Security and Privacy, pp. 48-62. IEEE, 2013.
Tripple et al., "Checkmate: Automated synthesis of hardware exploits and security litmus tests", 2018 51st Annual IEEE/ACM International Symposium on Microarchitecture (MICRO), pp. 947-960. IEEE, 2018.

* cited by examiner

| Attack | Vulnerability Catergory | Regular Expression |
|---|---|---|
| Therac-25 Radiation Poisoning | Race Condition / TOCTOU Vulnerability | $bb_i$ (access system call)*, $bb_j$ (open system call)* |
| Ariane 5 Rocket Explosion | Integer Overflow | $bb_i$ (data invariant > max integer)* |
| Worcester Airport Control Tower Communication Hack | Buffer Overflow | $bb_i$ (dynamic memory allocation)*, $bb_j$ (overflow of memory), $bb_k$ (frame pointer with overwritten memory) |
| Bellingham, Washington, Pipeline Rupture | Buffer Overflow | $bb_i$ (dynamic memory allocation)*, $bb_j$ (overflow of memory), $bb_k$ (frame pointer with overwritten memory) |
| Maroochy Shire Wastewater Plant Compromised | Access Control / Privilege Escalation | $bb_i$ (critical component with one factor or one man authentication)* |
| Davis-Besse Nuclear Power Plant Worm | Malware / Privilege Escalation | $bb_i$ (critical component with one factor or one man authentication)* |
| Worm Cripples CSX Transport System | Malware / Privilege Escalation | $bb_i$ (critical component with one factor or one man authentication)* |
| Worm Cripples Industrial Plants | Malware / Privilege Escalation | $bb_i$ (critical component with one factor or one man authentication)* |
| Browns Ferry Nuclear Plant | Distributed Denial of Service (DDoS) Attack | $bb_i$ (port traffic per second > threshold) |
| LA Traffic System Attack | DDos Attack | $bb_i$ (data invariant > threshold) |
| Aurora Generator Test | Protocol Vulnerability | $bb_i$ (access requested)*, $bb_j$ (no mutual authentication)* |
| Internet Attack on Epileptics | SQL Injection | $bb_i$ (user input)*, $bb_j$ (user input not compliant with database format) |
| Turkish Oil Pipeline Rupture | Privilege Escalation / DDoS | $bb_i$ (critical component with one factor or one man authentication)* + $bb_j$ (data invariant > threshold) |
| Stuxnet Attack on Iranian Nuclear Power Facility | Malware through USB | $bb_i$ (executive file of new executable at kernel level)*, $bb_j$ (sending data through port to external C2) |
| Tests of Insulin Pumps | No Authentication + No Encryption Replay Attacks | $bb_i$ (transaction requested)*, $bb_j$ (no time stamp check)*, $bb_k$ (no mutual authentication)*, $bb_l$ (no hash check)*, $bb_i$ (data in transit not encrypted)* |

*FIG. 3(a)*

| | | |
|---|---|---|
| Houston, Texas, Water Distribution System Hack | Weak Access Management | $bb_i$ (access requested)*, $bb_j$ (no strong authentication, e.g., no public key infrastructure based authentication on two factor authentication)* |
| Researcher Defeats Key Card Locks | No Authentication | $bb_i$ (access requested)*, $bb_j$ (no mutual authentication)*, $bb_k$ (encryption key read from memory in unencrypted format)* |
| Test of Traffic Vulnerabilities | Weak Cryptographic Measures | $bb_i$ (no encryption of data/commands)* + $bb_j$ (no digital sign on sensor firmware)*, $bb_k$ (illegal access through unobstructed port)*, ($bb_l$ (reconfigure the system specs)* +($bb_m$ (access memory buffer), $bb_n$ (overwrite memory buffer))*)) |
| German Steel Mill Attack | Malware / Privilege Escalation | $bb_h$ (open downloaded file from spear-phishing email)*, $bb_i$ (executive downloaded file from email)*, $bb_j$ (critical component with one factor or one man authentication)*, $bb_k$ (access business network)*, $bb_l$ (access ports of entry to production network)*, $bb_m$ (manipulate commands to the system)* |
| Fatal Military Aircraft Crash Linked to Software Fault | Software Fault | $bb_i$ (access system files)*, $bb_j$ (rewrite code for updates)*, $bb_k$ (delete/modify important system files)* |
| Test of Smart Rifles | Weak Password | $bb_i$ (weak WiFi password)*, ($bb_j$ (alter state variables)* + $bb_k$ (gain root access)) |
| Black Energy Ukranian Power Grid Attack | Weak Authentication | $bb_i$ (spear phishing emails to access business network)*, $bb_j$ (maneuver into the production network)*, ($bb_k$ (erased critical files on disk) + $bb_m$ (took control over important network nodes)*) |
| Mirai Botnet Attack | Weak Authentication + DDoS | $bb_i$ (weak password)*, $bb_j$ (port traffic per second > threshold) |
| Unidentified Water Distribution Facility Hack | Web Vulnerabilities | ($bb_i$ (phishing emails to access credentials)* + $bb_j$ (SQL injection attacks to get credentials)*), $bb_k$ (weak storage of credentials on front-end server) |
| WannaCry Ransomware Attacks | Buffer Overflow | $bb_i$ (dynamic memory allocation)*, $bb_j$ (overflow of memory)*, $bb_k$ (frame pointer with overwritten memory in SMBv1 buffer)* |
| | Cryptographic Key Management | $bb_i$ (process starts encrypting data)*, $bb_j$ (process new to the system and not whitelisted)* |

*FIG. 3(b)*

| Attribute | Memory Overflow | SQL Query with Format-F |
|---|---|---|
| Memory | 1 | 0 |
| Data/Database | 0 | 1 |
| Security Vulnerability | 0 | 0 |
| Port/Gateway | 0 | 0 |
| Sensor | 0 | 0 |
| Malware | 0 | 0 |
| Head Node | 0 | 0 |
| Leaf Node | 0 | 1 |
| Mean Height | 1 | 3.75 |

*FIG. 8*

| Parameter | Value |
|---|---|
| C | 1.0 |
| Kernel | RBF |
| $\gamma$ | 0.0556 |
| Shrinking Heuristic | Used |
| Tolerance for Stopping | $10^{-3}$ |

*FIG. 9*

| Model | Accuracy | Precision | Recall | FPR | F1 |
|---|---|---|---|---|---|
| Decision Tree | 86.8% | 0.40 | 0.89 | 0.14 | 0.55 |
| k-NN (k=2) | 92.8% | 0.60 | 0.62 | 0.04 | 0.61 |
| k-NN (k=3) | 92.0% | 0.54 | 0.88 | 0.08 | 0.67 |
| k-NN (k=4) | 94.5% | 0.70 | 0.70 | 0.03 | 0.70 |
| k-NN (k=5) | 93.0% | 0.58 | 0.86 | 0.06 | 0.69 |
| Naive Bayes | 90.5% | 0.46 | 0.26 | 0.03 | 0.34 |
| SVM (C=1) | 97.7% | 0.82 | 1.0 | 0.03 | 0.90 |
| Linear SVM with SGD | 90.6% | 0.49 | 0.75 | 0.08 | 0.59 |
| SVM (C=2) | 93.8% | 0.60 | 0.97 | 0.06 | 0.76 |
| SVM (C=3) | 92.8% | 0.56 | 0.96 | 0.08 | 0.71 |

*FIG. 10*

| Branch Discovered | Attack Category |
|---|---|
| Read Downloaded File from Email → Overflow of Memory | Buffer Overflow |
| Access Network Ports → Encrypt Data and Destroy Key | Privilege Escalation |
| Access System Files and DB → Reconfigure System Specification | Access Control |
| Download Unwhitelisted Malware → Bypass Firewall Using Backdoor | Malware |
| Access Network Address → Encryption Key Read from Memory in Unencrypted Form | Cryptographic Flaw |
| Critical Component with 1-factor Authentication → Access Basic Input/Output System (BIOS) Image | BIOS Boot Level Attack |
| Exploit Malware to Access System as Root → Cache Poisoning | Cache Poisoning |

*FIG. 11*

| N=1192 | Actual = No | Actual = Yes | |
|---|---|---|---|
| Predicted = No | TN = 1043 | FN = 0 | 1043 |
| Predicted = Yes | FP = 27 | TP = 122 | 149 |
| | 1070 | 122 | |

SYSTEM AND METHOD FOR SECURITY IN INTERNET-OF-THINGS AND CYBER-PHYSICAL SYSTEMS BASED ON MACHINE LEARNING

CROSS-REFERENCE TO RELATED APPLICATIONS

This application claims priority to provisional application 62/839,192, filed Apr. 26, 2019, which is herein incorporated by reference in its entirety.

STATEMENT REGARDING FEDERALLY SPONSORED RESEARCH OR DEVELOPMENT

This invention was made with government support under Grant No. CNS-1617628 awarded by the National Science Foundation. The government has certain rights in the invention.

FIELD OF THE INVENTION

The present invention relates generally to Internet of Things (IoT) and cyber-physical systems (CPSs) and, more particularly, to a machine learning based framework for efficient vulnerability detection, threat intelligence, and incident response for any IoT device or CPS.

BACKGROUND OF THE INVENTION

Cyber-physical systems (CPS) use sensors to feed data to computing elements that monitor and control physical systems and use actuators to elicit desired changes in the environment. Internet-of-Things (IoT) enables diverse, uniquely identifiable, and resource-constrained devices (sensors, processing elements, actuators) to exchange data through the Internet and optimize desired processes. CPS/IoT have a plethora of applications, like smart cities, smart healthcare, smart homes, nuclear plants, smart grids, autonomous vehicles, and in various other domains. With recent advances in CPS/IoT-facilitating technologies like machine learning (ML), cloud computing, and 5G communication systems, CPS/IoT are likely to have an even more widespread impact in the near future.

An unfortunate consequence of integrating multiple, diverse devices into the same network is the dramatic increase in the attack surface within the ecosystem. Most of the IoT devices are energy-constrained, which makes them unable to implement elaborate cryptographic protocols and conventional security measures across the software, hardware, and network stacks. The diverse range of embedded devices in the network, coupled with an absence of standard cryptographic and security countermeasures, makes IoT a favorable playground for malicious attackers. Although lightweight cryptographic protocols and hardware-based lightweight device authentication protocols mitigate some threats, most of the vulnerabilities remain unaddressed. Another challenge in securing IoT frameworks is the enormous amount of accessible data generated by the numerous communication channels among devices. These data, in the absence of cryptographic encryption, pose a threat to user privacy, data confidentiality, and integrity. Besides such challenges, IoT remains vulnerable to advanced traditional exploits of vulnerabilities, like buffer overflows, race conditions, cross-site scripting (XSS) attacks, etc. Zero-day attacks, i.e., attacks that have never been witnessed before, pose a high threat to the IoT ecosystem.

Many major classes of security vulnerabilities like memory corruption bugs, network intrusion attacks, and hardware exploits can be detected using automation techniques. The domain of cybersecurity that has been highly influenced by the popularity of ML are intrusion detection systems (IDS). Prior to the rapid advancement of ML, IDS included signature-based methods and anomaly-based techniques to detect intrusions on the network or the host systems. These performed well but they had significant drawbacks. Signature-based methods require regular updates of the software and are unable to detect zero-day exploits. Anomaly-based methods can detect zero-day exploits but they have a very high FAR (false alarm rate).

The advent of ML alleviated some of these drawbacks and was adapted widely in IDS. Researchers have used a wide variety of ML methodologies to tackle this problem. These prior methods provide a reactive security mechanism to detect ongoing attacks. They also require a lot of computational overhead because the models need to be continuously trained on recent data and all incoming traffic must be processed by the ML model before it can be catered to by the system.

Memory corruption bugs have been a long-standing vulnerability in computer systems. Automation attempts have also been made in detecting such bugs. For instance, static analysis is used to detect memory corruption vulnerabilities like buffer overflow attacks. The discovery of hardware vulnerabilities like SPECTRE and Meltdown in 2018 opened the gateways to new classes of side-channel attacks on the microarchitecture of the device.

Attack graphs are a notable solution for analyzing the security of systems and networks. However, generation and analysis of the attack graphs have been a longstanding challenge due to the state explosion problem, where the attack graphs become unmanageably enormous and complex. This has so far limited attack graphs to very specific, narrow systems, as opposed to a generalized attack graph that can be applied to detect vulnerabilities in any CPS/IoT.

As such, there is a need for a system and method for automatically detecting vulnerabilities in the entire hardware, software, and network stacks of IoT devices and CPSs that can provide proactive security and zero run-time overhead.

SUMMARY OF THE INVENTION

According to various embodiments, a method for detecting security vulnerabilities in at least one of cyber-physical systems (CPSs) and Internet of Things (IoT) devices is disclosed. The method includes constructing an attack directed acyclic graph (DAG) from a plurality of regular expressions, where each regular expression corresponds to control-data flow for a known CPS/IoT attack. The attack DAG includes a plurality of nodes and a plurality of paths, where each node represents a system-level operation of the CPS or IoT device and each path represents a CPS/IoT attack vector. The method further includes performing a linear search on the attack DAG to determine unexploited CPS/IoT attack vectors, where a path in the attack DAG that does not represent a known CPS/IoT attack vector represents an unexploited CPS/IoT attack vector. The method also includes applying a trained machine learning module to the attack DAG to predict new CPS/IoT vulnerability exploits. The trained machine learning module is configured to determine a feasibility of linking unconnected nodes in the attack DAG to create a new branch representing a new CPS/IoT vulnerability exploit. The method further includes constructing a defense DAG configured to protect against the known CPS/IoT attacks, the unexploited CPS/IoT attacks, and the new CPS/IoT vulnerability exploits.

According to various embodiments, a system for detecting security vulnerabilities in at least one of cyber-physical systems (CPSs) and Internet of Things (IoT) devices is disclosed. The system includes one or more processors. The processors are configured to construct an attack directed acyclic graph (DAG) from a plurality of regular expressions, where each regular expression corresponds to control-data flow for a known CPS/IoT attack. The attack DAG includes a plurality of nodes and a plurality of paths, where each node represents a system-level operation of the CPS or IoT device and each path represents a CPS/IoT attack vector. The processors are further configured to perform a linear search on the attack DAG to determine unexploited CPS/IoT attacks vectors, where a path in the attack DAG that does not represent a known CPS/IoT attack vector represents an unexploited CPS/IoT attack vector. The processors are additionally configured to apply a trained machine learning module to the attack DAG to predict new CPS/IoT vulnerability exploits. The trained machine learning module is configured to determine a feasibility of linking unconnected nodes in the attack DAG to create a new branch representing a new CPS/IoT vulnerability exploit. The processors are further configured to construct a defense DAG to protect against the known CPS/IoT attacks, the unexploited CPS/IoT attacks, and the new CPS/IoT vulnerability exploits.

According to various embodiments, a non-transitory computer-readable medium having stored thereon a computer program for execution by a processor configured to perform a method for detecting security vulnerabilities in at least one of cyber-physical systems (CPSs) and Internet of Things (IoT) devices is disclosed. The method includes constructing an attack directed acyclic graph (DAG) from a plurality of regular expressions, where each regular expression corresponds to control-data flow for a known CPS/IoT attack. The attack DAG includes a plurality of nodes and a plurality of paths, where each node represents a system-level operation of the CPS or IoT device and each path represents a CPS/IoT attack vector. The method further includes performing a linear search on the attack DAG to determine unexploited CPS/IoT attack vectors, where a path in the attack DAG that does not represent a known CPS/IoT attack vector represents an unexploited CPS/IoT attack vector. The method also includes applying a trained machine learning module to the attack DAG to predict new CPS/IoT vulnerability exploits. The trained machine learning module is configured to determine a feasibility of linking unconnected nodes in the attack DAG to create a new branch representing a new CPS/IoT vulnerability exploit. The method further includes constructing a defense DAG configured to protect against the known CPS/IoT attacks, the unexploited CPS/IoT attacks, and the new CPS/IoT vulnerability exploits.

Various other features and advantages will be made apparent from the following detailed description and the drawings.

BRIEF DESCRIPTION OF THE DRAWINGS

In order for the advantages of the invention to be readily understood, a more particular description of the invention briefly described above will be rendered by reference to specific embodiments that are illustrated in the appended drawings. Understanding that these drawings depict only exemplary embodiments of the invention and are not, therefore, to be considered to be limiting its scope, the invention will be described and explained with additional specificity and detail through the use of the accompanying drawings, in which:

FIG. 3($a$) depicts a first part of a table of real-world IoT/CPS attacks and regular expressions according to an embodiment of the present invention;

FIG. 3($b$) depicts a second part of a table of real-world IoT/CPS attacks and regular expressions according to an embodiment of the present invention;

FIG. 6($b$) depicts a second part of a flow chart of an aggregated attack direct acyclic graph according to an embodiment of the present invention;

FIG. 7($b$) depicts a flow chart of an attack vector where a network vulnerability is exploited to send arbitrary commands to a system according to an embodiment of the present invention;

FIG. 7($c$) depicts a flow chart of attack vectors that are obtained by the combination of two control-data flow graphs according to an embodiment of the present invention;

FIG. 7($d$) depicts a flow chart of discovering unexploited attack vectors with a linear exhaustive search of the combined control-data flow graph according to an embodiment of the present invention;

FIG. 8 depicts a table of node attributes according to an embodiment of the present invention;

FIG. 9 depicts a table of support vector machine parameters according to an embodiment of the present invention;

FIG. 10 depicts a table of performance of machine learning algorithms according to an embodiment of the present invention;

FIG. 11 depicts a table of novel exploits discovered by a ML model according to an embodiment of the present invention;

DETAILED DESCRIPTION OF THE INVENTION

Figure 1:
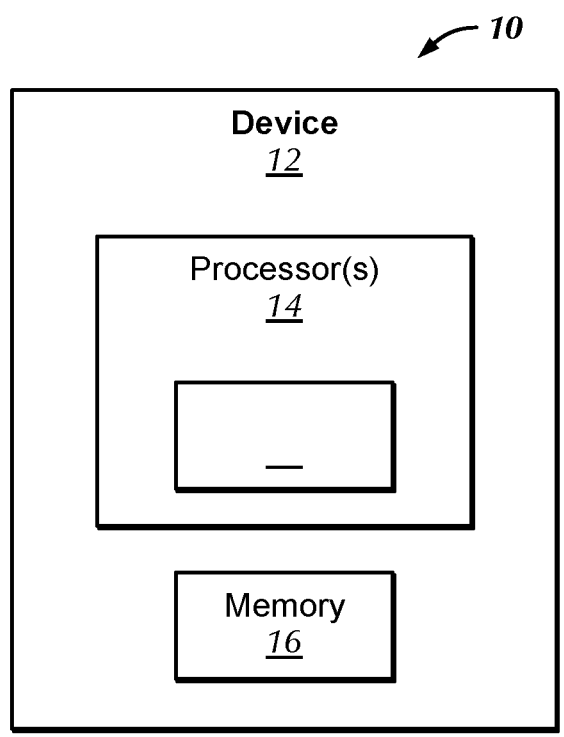
FIG. 1 depicts a block diagram of system for implementing a machine learning based security system according to an embodiment of the present invention.

Cyber-physical systems (CPS) and Internet-of-Things (IoT) devices are increasingly being deployed across multiple functionalities, ranging from healthcare devices and wearables to critical infrastructure, e.g., nuclear power plants, autonomous vehicles, smart cities, and smart homes. These systems and devices are inherently insecure across their comprehensive software, hardware, and network stacks, thus presenting a large vulnerability surface that can be exploited by hackers. As such, according to various embodiments, disclosed herein is an innovative technique for detecting unknown system vulnerabilities, manage associated vulnerabilities, and improve incident response when such vulnerabilities are exploited. Some of the novelty of this approach lies in extracting intelligence from known real-world CPS and IoT attacks, representing them in the form of regular expressions, and employing machine learning (ML) techniques on this ensemble of regular expressions to generate new attacks. Experimental results show that 10 new attack vectors and 122 new vulnerability exploits can be successfully generated that have the potential to exploit an IoT ecosystem. The ML methodology achieves an accuracy of 97.73% and enables prediction of these attacks with 87.5% reduced human expertise. To defend against all known attacks and possible novel exploits, further disclosed is a defense in depth and multi-level security (MLS) mechanism for various classes of attacks. This MLS defense mechanism optimizes the cost of safety measures based on the sensitivity of the protected resource, thus incentivizing its adoption in real-world IoT systems and CPSs by cybersecurity practitioners.

According to various embodiments, disclosed herein is an ML-based approach to systematically generate new exploits in a CPS and IoT framework. ML has already found use in CPS and IoT cybersecurity, primarily in intrusion and anomaly detection systems. These systems execute ML methodology on data generated by network logs and communication channels. In the disclosed methodology, ML operates at the system level to predict known and unknown exploits against the control and data flow of the execution of the IoT system. According to various embodiments, a set of real-world CPS and IoT attacks that have been documented are analyzed and represented as regular expressions. An ML algorithm is then trained with these regular expressions. The trained ML model can predict the feasibility of a new attack. The attack vectors predicted to be highly feasible by the ML algorithm are reported as novel exploits. Security mechanisms to defend against such attacks are also disclosed.

The novelty of this approach lies in at least:
(1) Representation of real-world CPS/IoT attacks in the form of regular expressions and control-data flow graphs (CDFGs), where both control flow and data invariants are instrumented at low system levels.
(2) Creation of an aggregated attack directed acyclic graph (DAG) with an ensemble of such regular expressions.
(3) Use of an ML model trained with these regular expressions to generate novel exploits in a given CPS/IoT framework.

The disclosed framework for securing IoT devices and CPS infrastructure, to be described in greater detail below, is based on developments along two important directions. Recognizing the need to depart from the traditional approaches to cybersecurity, it is observed that the main objective of many security attacks on IoT devices is to modify the behavior of the end-system to cause unsafe operation. Based on this insight, it is disclosed to model the behavior of a CPS infrastructure under attack, at the system and network levels, and use ML to discover a more exhaustive potential attack space, and then map it to a defense space.

This approach enables addressing of at least the following issues:
(1) In the context of IoT devices in general, and smart cities in particular, this approach enhances IoT data integrity, confidentiality, and availability while ensuring reliability of information collected from various types of sensors.
(2) This approach enables the preemptive analysis of attack vectors across a large variety of devices, analyzing them, detecting new attacks, and deploying patches preemptively.
(3) This approach ensures security of communication between devices and bridges the cyber-physical security gap.

Coupled with other technologies, such as (i) lightweight cryptographic protocols, (ii) cryptographic primitives at the level of the devices and networks, (iii) data auditing using immutable databases, and (iv) intrusion detection systems to detect anomalous behavior in the network, embodiments of the disclosed system and methodology greatly enhances end-to-end security.

Regular Expressions

A regular expression is used to denote a set of string patterns. Here, regular expressions are used to represent known attacks on CPS and IoT ecosystems in a compact and coherent manner.

The set of all possible characters permissible in a regular expression is referred to as its alphabet $\Sigma$. The basic operations permitted in regular expressions are:
(1) Set Union: This represents the set union of two regular expressions. For example, if expression A denotes $\{xy, z\}$ and B denotes $\{xy, r, pq\}$, then A+B denotes $\{xy, z, r, pq\}$.
(2) Concatenation: This operation represents the set of strings obtained by attaching any string in the first expression with any string in the second expression. For example, if A=$\{xy, z\}$ and B=$\{r,pq\}$, then AB=$\{xyr, xypq, zr, zpq\}$.
(3) Kleene Star: A* denotes the set of strings obtained by concatenating the strings in A any number of times. A* also includes the null string $\lambda$. For example, if A=$\{xy, z\}$, then A*=$\{\lambda, xy, z, xyz, zxy, xyxy, zz, xyxyxy, xyzxy, \ldots\}$.

Control-Data Flow Graph (CDFG)

The CDFG of a program is a graphical representation of all possible control paths and data dependencies that the program might encounter during its execution. The basic blocks of the program constitute the nodes of the CDFG. A basic block is a block of sequential statements that satisfy the following properties:
(1) The control flow enters only at the beginning of the block.
(2) The control flow leaves only at the end of the block.
(3) A block contains a data invariant or a low-level system call.

The directed edges between nodes depict a possible control-data flow in the program. The disclosed embodiments construct CDFGs at a higher granularity, to be described in further detail below. The CDFGs are at the level of human-executable instructions rather than assembly-level instructions.

Support Vector Machine

Disclosed herein, ML is employed at the system level. Since the training dataset does not have enough training examples to train a robust neural network, traditional ML approaches are used for classification instead of deep learning. Among traditional ML classification methodologies, SVM is one of the most robust classifiers that generalizes quite well. However, other classifiers may be used including but not limited to K-nearest neighbor, decision tree, and naïve Bayes.

SVM is a class of supervised ML methodologies that analyzes a labeled training dataset to perform either classification or regression. It is capable of predicting the label of a new example with high accuracy. It is designed to be a linear binary classifier, but kernel transformations can be used to perform nonlinear classification as well. For a dataset with n-dimensional features, a trained SVM model learns an (n−1)-dimensional hyperplane that serves as the decision boundary, also referred to as the separating hyperplane.

Many contemporary ML algorithms, e.g., k-nearest-neighbor classification, use a greedy search approach. However, SVM uses a quadratic optimization algorithm to output an optimal decision boundary. The two main limitations of SVM are its natural binding to binary classification and the need to specify (rather than learn) a kernel function.

System Overview

FIG. 1 illustrates a system 10 configured to implement machine learning based vulnerability detection. The system 10 includes a cyber-physical or IoT device 12. The device 12 may be implemented in a variety of configurations including general computing devices such as but not limited to desktop computers, laptop computers, tablets, network appliances, and the like. The device 12 may also be implemented as a mobile device such as but not limited to a mobile phone, smart phone, smart watch, or tablet computer. The device 12 can also include but is not limited to IoT sensors. The device 12 includes one or more processors 14 such as but not limited to a central processing unit (CPU), a graphics processing unit (GPU), or a field programmable gate array (FPGA) for performing specific functions and memory 16 for storing those functions. The processor 14 includes a machine learning (ML) module 18 for detecting vulnerabilities. The ML module 18 methodology will be described in greater detail below.

It is also to be noted the training process for the ML module 18 may be implemented in a number of configurations with a variety of processors (including but not limited to central processing units (CPUs), graphics processing units (GPUs), and field programmable gate arrays (FPGAs)), such as servers, desktop computers, laptop computers, tablets, and the like.

Methodology

Figure 2:
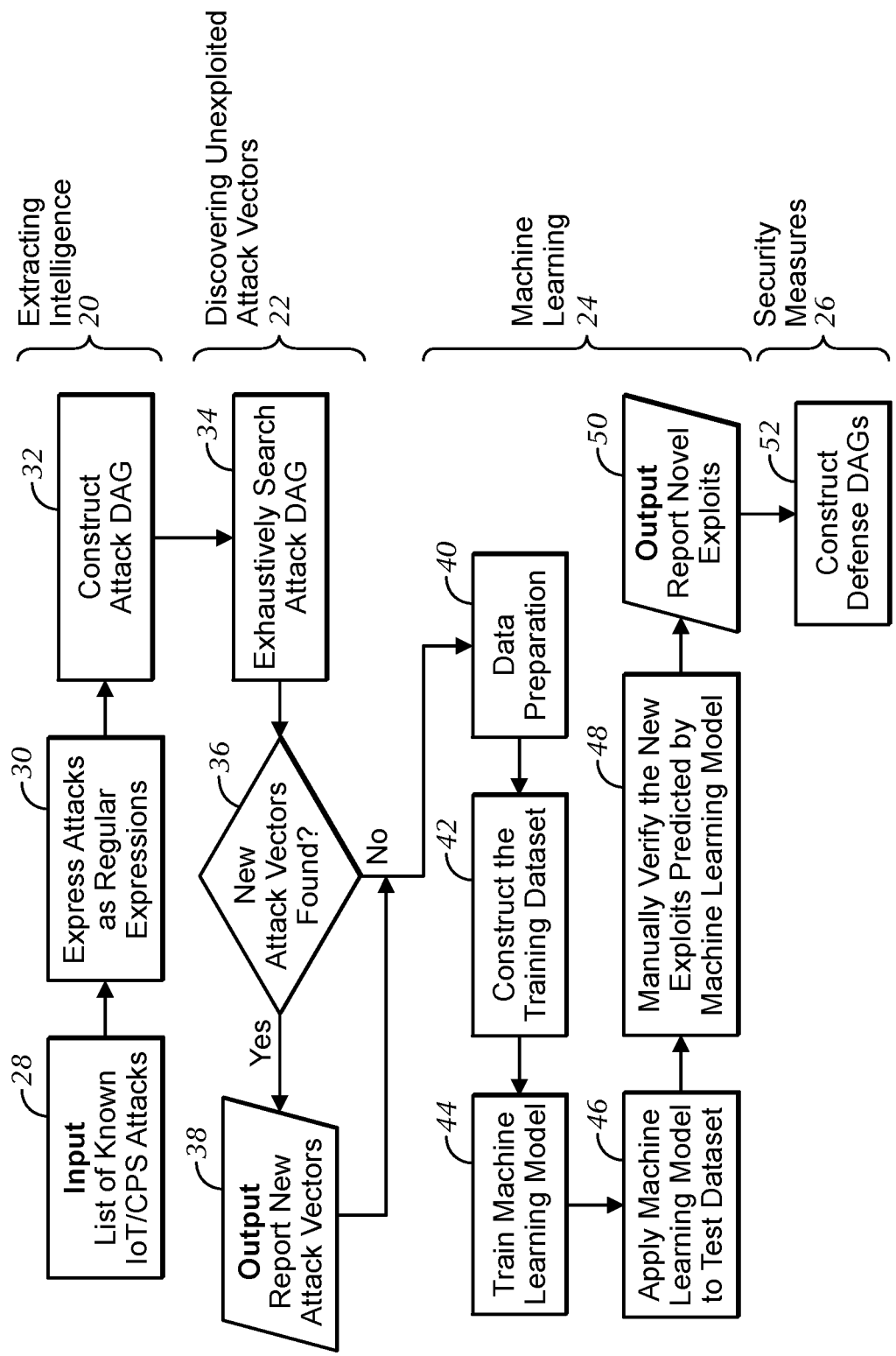
FIG. 2 depicts a flow chart of overall methodology according to an embodiment of the present invention.

In the disclosed methodology for the ML module 18, system-level adversarial intelligence is extracted from an ensemble of known attacks on IoT/CPS and used to predict other possible exploits in a given IoT/CPS framework. The automated derivation of novel exploits and defenses includes extracting intelligence 20, creating novel exploits 22, applying ML 24, and taking measures to secure the system 26. These processes are generally depicted in the flowchart of FIG. 2.

Extracting Intelligence 20

The first step 28 in extracting intelligence includes documenting and decomposing existing cyberattacks on CPS and IoT systems into their constituent system-level actions and used data invariants. Multiple vulnerabilities across the software, hardware, and network stacks are exposed during such a decomposition of attacks. Then at step 30, regular expressions are used to represent these constituent system-level actions. Then at step 32, the regular expression of all the attacks are combined to form an ensemble of interconnected system-level operations. This ensemble is represented as a directed acyclic graph (DAG). This DAG is henceforth referred to as the aggregated attack DAG.

For data collection at step 28, the objective is to extract knowledge from known attack patterns. To achieve this objective, a table of known IoT and CPS attacks is created. Then these attacks are classified into various categories based on the type of vulnerability being exploited. A non-limiting example of this table includes 41 different attacks. A detailed list of attacks and their corresponding regular expressions is provided in the table in FIGS. 3(a)-(b).

Figure 4:
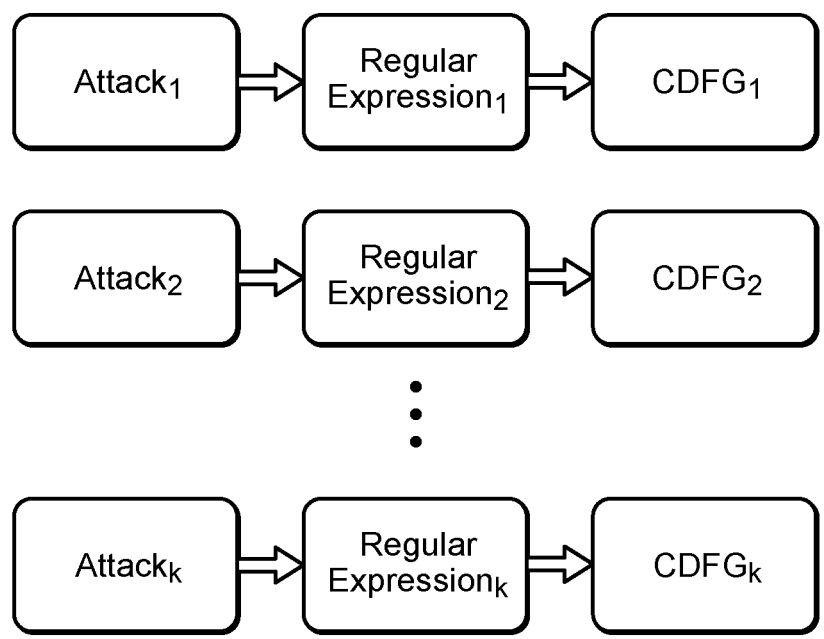
FIG. 4 depicts a data transformation overview of a list containing k types of IoT/CPS attacks according to an embodiment of the present invention.

For data transformation at step 30, each attack is decomposed into its basic system-level operations. The sequences of operations are expressed as regular expressions, which are then represented as CDFGs, as depicted in FIG. 4. The system-level operations form the basic blocks of CDFGs. Thus, each attack is now transformed into a CDFG with system-level operations as its basic blocks.

The methodology of decomposing an attack into a CDFG starts with analyzing the various steps of the attack and decomposing it into a series of sequential actions. Then multiple system-specific instructions are combined into a single basic block. This is done to ensure that the attack vector is general enough to be deployed as an intermediate step of a more complex attack.

As a nonlimiting example, a description of the data transformation procedure for a buffer overflow attack is provided next. A buffer overflow attack can be expressed as a sequence of the following actions:

(1) dynamic memory allocation,
(2) overflow of memory, and
(3) frame pointer with overwritten memory.

Figure 5:
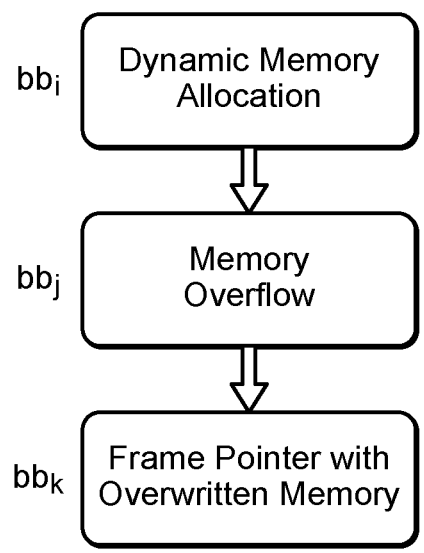
FIG. 5 depicts a control-data graph of buffer overflow attacks according to an embodiment of the present invention.

The CDFG for buffer overflow is depicted in FIG. 5. Here, $bb_i$ denotes the dynamic memory allocation that occurs in the memory stack before a buffer overflow occurs, denoted as $bb_j$. The Kleene star operation suggests that $bb_i$ might be executed multiple times before $bb_j$ is executed. This regular expression is then converted into a CDFG. Ideally, there should be a self-loop on $bb_i$, but self-loops are omitted in these CDFGs so that it is a DAG. The basic block $bb_k$ denotes the action of overwriting the frame pointer in the memory stack by user-defined input, which causes the system to crash.

Figure 6A:
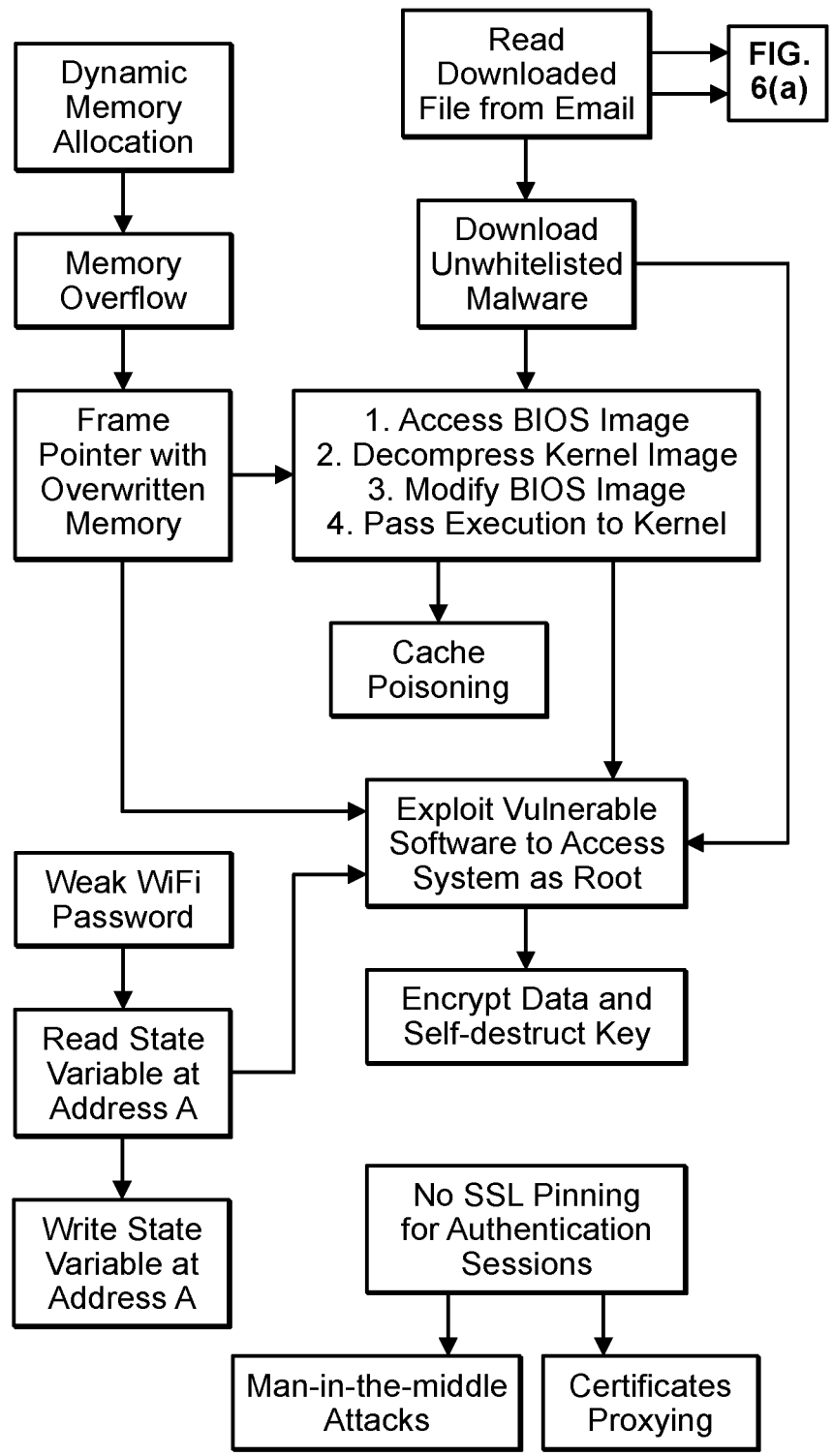
FIG. 6($a$) depicts a first part of a flow chart of an aggregated attack directed acyclic graph according to an embodiment of the present invention.
Figure 6B:
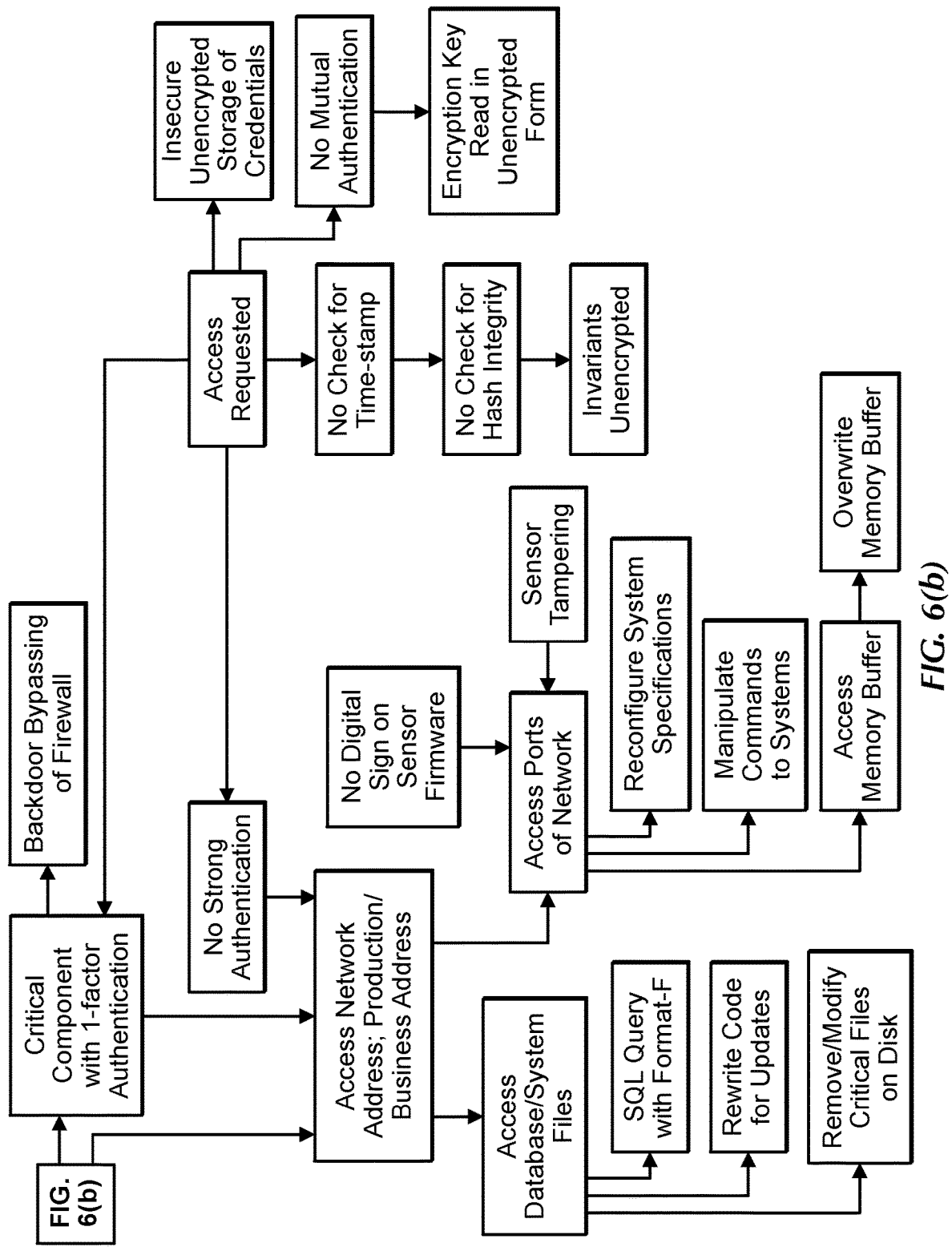
Figure 7A:
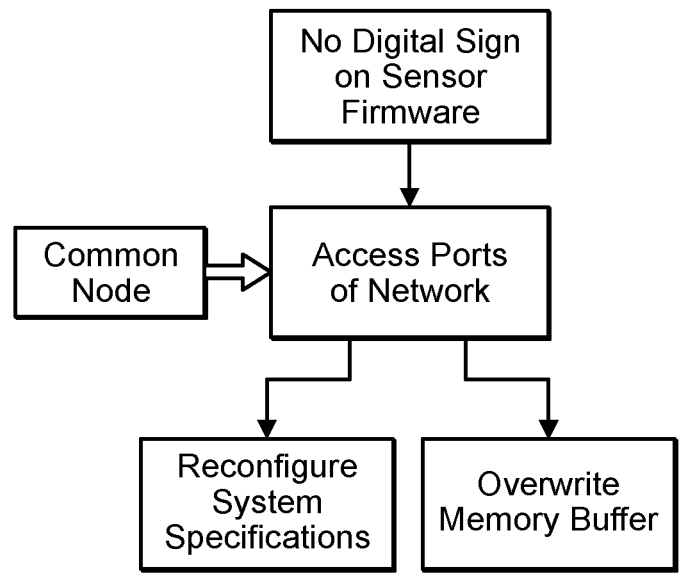
FIG. 7($a$) depicts a flow chart of an attack vector where a network vulnerability is exploited through an insecure sensor firmware according to an embodiment of the present invention.
Figure 7B:
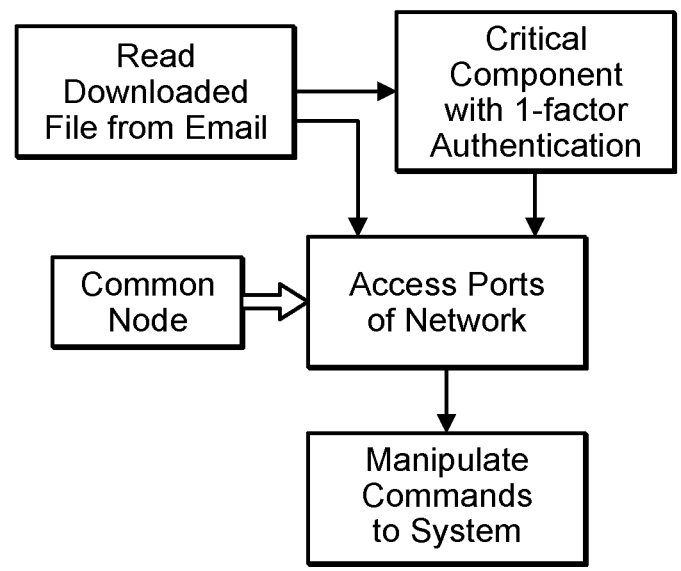
Figure 7C:
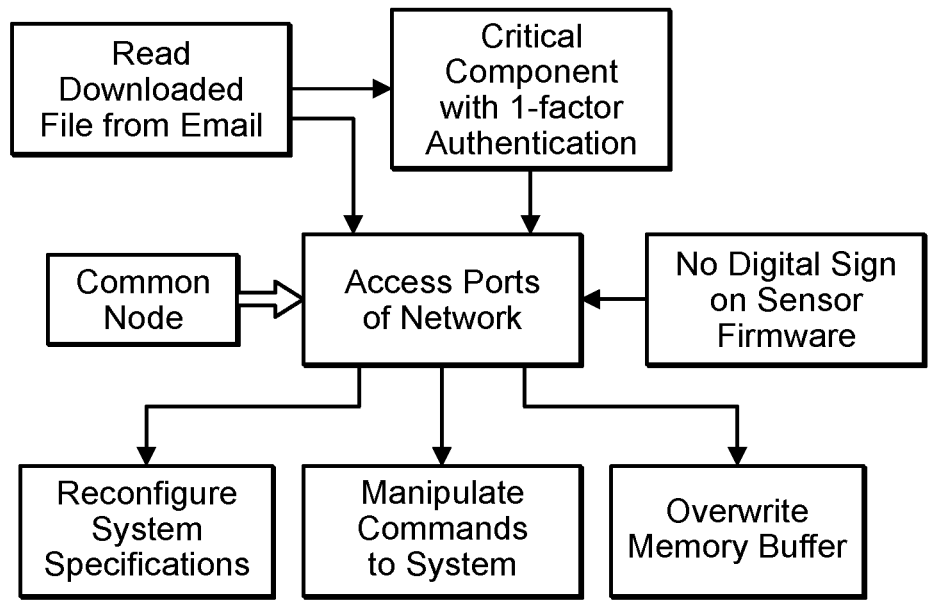
Figure 7D:
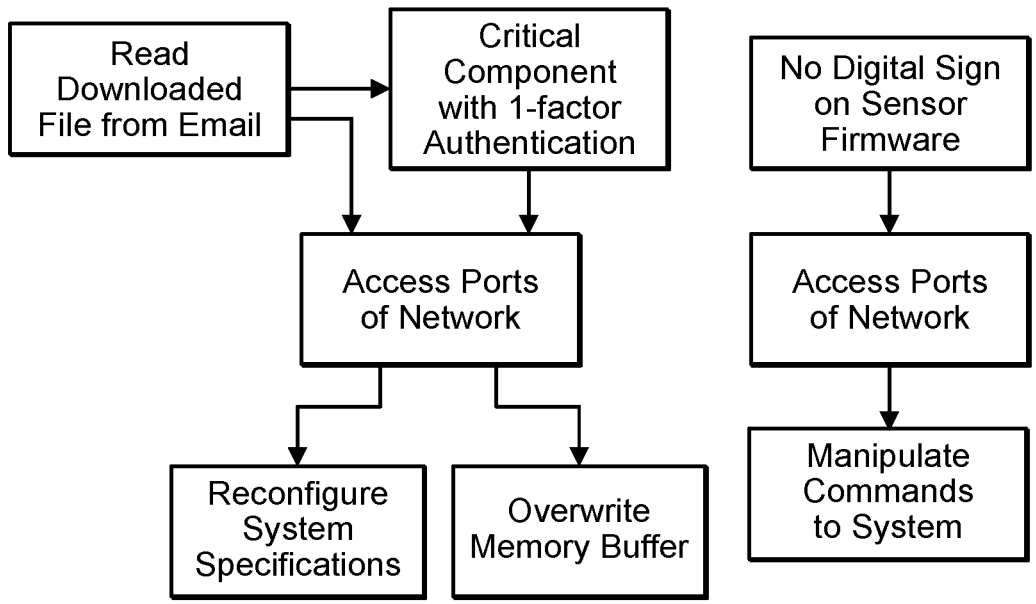

For constructing the attack DAG at step 32, every attack is represented by a unique CDFG. Then, all the CDFGs are combined to form a single DAG, which is referred to as the aggregated attack DAG. A nonlimiting example of a detailed attack DAG is shown in FIGS. 6(a)-(b). This attack DAG is a concise representation of the system and network-level operations of all the known categories of CPS and IoT attacks. Every path from a head node to a leaf node in the attack DAG corresponds to a unique attack vector.

It is observed that certain blocks appear in multiple attack vectors. These blocks are represented as a single node in the attack DAG with in-degree and/or out-degree greater than 1. The example attack DAG has 37 nodes, represents 41 different attacks, and has a maximum depth of 6. As to be described in greater detail below, the attack DAG has the potential for new paths representing unexploited attack vectors and new branches representing new vulnerability exploits.

Discovering Unexploited Attack Vectors 22

The attack DAG has some novel exploits embedded in it that can be discovered by a linear exhaustive search on it at step 34. A query whether unexploited attack vectors are found is established at step 36. If new exploits are found, they should be reported in an output at step 38. If no new exploits are found, the methodology proceeds to the machine learning section 24, to be described later. Every path from a head node to a leaf node corresponds to a unique attack vector. The example attack DAG has 51 such paths. However, only 41 known attacks were considered while constructing the attack DAG. Thus, 10 new attack vectors are obtained through search of all attack paths. These 10 new attacks are unexploited attack vectors. New attack vectors emerge due to the convergence of multiple attack paths at common basic block(s). Such an occurrence is illustrated in FIGS. 7(*a*)-(*d*).

FIGS. 7(*a*) and 10(*b*) represent two sub-graphs of the attack DAG in FIGS. 6(*a*)-(*b*). FIG. 7(*c*) shows the graph obtained by combining FIGS. 7(*a*) and 7(*b*) at the common node titled "access ports of network". FIG. 7(*d*) depicts the new paths obtained from the combination of the two graphs. The five new paths thus discovered correspond to the five attack vectors that have not yet been exploited in that sequence of the exploit chain in a CPS or IoT system.

Applying Machine Learning 24

Once the known attacks in the attack DAG are represented, it is observed that some of its unconnected nodes can be linked together. Every new feasible link that is predicted by the ML model is considered to be a novel exploit of vulnerabilities. A link or branch is considered to be feasible if the control data flow represented by that branch can be implemented in a real-world system. As mentioned earlier, every complete path in the attack DAG from a head node to a tail node corresponds to a unique attack vector. ML models are used to predict if branches between various pairs of nodes of the attack DAG are feasible. Manual verification of the feasibility of all possible branches in the attack DAG is too time-consuming. As more attacks get built into the graph, manually parsing the DAG for attacks becomes intractable, which makes it likely impossible to manually build an exploit chain that parses all blocks, system calls, and data invariants.

Let n be the number of nodes in the attack DAG and c be the number of examples in the training dataset. Then the size of the search space of possible branches is:

$$2\binom{n}{2} - c = n(n-1) - c = n^2 - n - c = \theta(n^2) \quad (1)$$

This quadratic dependence makes it very expensive (likely impossible) to perform manual checks to exhaustively examine the feasibility of all the possible branches. Attack graphs generated for even moderate-sized networks suffer from a significant explosion problem due to this quadratic dependence, leading to an unmanageable size for manually searching vulnerability exploits.

In the experiments detailed further below, it is shown that using ML can reduce the search space by 87.5%. The ML model is trained using the attack DAG of known attack vectors. Once trained, it can predict the feasibility of new branches in the attack DAG. An SVM model is derived for this purpose. However, other classifiers may be used including but not limited to K-nearest neighbor, decision tree, and naïve Bayes.

Since the dataset here is very small, including 140 datapoints, a neural network cannot adequately be trained. However, if the disclosed methodology is applied to a larger scope of cyberattacks (for instance, at least approximately 2000 datapoints), a neural network model may be an effective tool.

The machine learning section 24 starts with a data preparation step 40. Various attributes (features) are assigned to the basic blocks of the attack DAG depending on the type of impact the attack would have on the system and network. The various attributes include but are not limited to memory, data/database, security vulnerability, port/gateway, sensor, malware, head node, leaf node, and mean depth of each node.

Each attribute, except the mean depth of nodes, has a binary value (0 or 1) associated with each feature. The mean depth of a node denotes its average depth in the DAG. For example, nodes "Memory overflow" and "SQL query with format-F" have the attributes shown in the table in FIG. 8.

A branch in the attack DAG is represented by an ordered pair of nodes, i.e., (origin node, destination node). The features of the branches of the attack DAG are required to train the ML model. The concatenation of the attributes of the origin and destination nodes represents the feature vector of a branch.

The next step 42 involves constructing the training dataset. The machine learning model learns from patterns that exist in known CPS/IoT attacks. This knowledge is encoded in the attack DAG. Thus, the training dataset is composed of all the existing branches (positive examples) and some infeasible branches (negative examples) of the attack DAG. The labels of the training dataset are: 1, if the branch exists in the attack DAG; and −1, if a branch from the origin to the destination node is not feasible.

A negatively labeled branch denotes an impossible control/data flow. Some negatively-labeled examples include but are not limited to branches from the leaf nodes to head nodes, branches that complete cycles in the attack DAG, and sequences of infeasible operations like exploitation of memory flow via certificate proxying. As a nonlimiting example, the training set used here for experimentation includes 140 examples, 39 of which have positive labels and the remaining have negative labels.

After constructing the training dataset, the machine learning model is trained at step 44. The ML model has multiple parameters that can be tuned to achieve optimal performance. The parameters used for training the machine learning model are shown in the table in FIG. 9. It is to be noted these parameters are not limiting and other parameters may be utilized in alternative embodiments.

(1) Regularization parameter (C): Regularization is used in ML models to prevent overfitting of the model to the training data. Overfitting causes the model to perform well on the training dataset but poorly on the test dataset. This parameter needs to be fine-tuned to obtain optimal performance of the model. The value of C is inversely proportional to the strength of regularization.

(2) Kernel: The kernel function transforms the input vector $x_i$ to a higher-dimensional vector space $\varphi(x_i)$, such that separability of inputs with different labels increases. The radial basis function (RBF) as the kernel function. The RBF kernel is defined as: $k(u, v) = e^{(-\gamma \|u-v\|)^2}$.

(3) Gamma (γ): Parameter γ defines how strong the influence of each training example is on the separating hyperplane. Higher (lower) values of γ denote a smaller (larger) circle of influence.

(4) Shrinking heuristic: The shrinking heuristic is used to train the model faster. The performance of the model does not change in the absence of this heuristic.

(5) Tolerance: The tolerance value determines the error margin that is tolerable during training. A higher tolerance value causes early stopping of the optimization process, resulting in a higher training error. A higher tolerance value also helps in preventing overfitting.

The machine learning model is applied to a test dataset at step 46. The machine learning model is used to predict the feasibility of all possible branches of the attack DAG. Therefore, the test dataset contains all possible branches except the datapoints present in the training dataset. Based on Equation (1) and the aggregated attack DAG, the test dataset contains 1192 potential branches.

The predictions of the new exploits by the machine learning model can be manually verified at step 48. A test example is positive if the sequence of the two basic blocks is a permissible control-data flow in a given system. Determining the control-data flow in a program is generally a hard task. However, here, the basic blocks are defined at a human-interpretative level. This makes it easier for a human expert to determine if the sequence of basic blocks in the test example is feasible or not.

For the test dataset here, the machine learning model predicted 149 positive labels out of 1192 test datapoints. A positive label indicates that the test datapoint is a potential attack vector. Manual verification of all the 1192 potential attack vectors in the DAG revealed that 1165 predictions by the machine learning model were accurate, resulting in a test accuracy of 97.73%.

The parameters were chosen to achieve zero false negatives. However, to eliminate potential false positives, manual verification of a reduced search space can be implemented. Without the vulnerability detection system disclosed herein, an expert would have to verify all 1192 potential attack vectors manually. But with this detection system, it is sufficient to verify only the 149 positive predictions of the SVM model. Thus, this detection system reduces a verifier's search space of positive attack vectors from 1192 to 149, which is an 87.5% reduction of manual checks.

Once verified, novel exploits are reported at step 50.

Experimental Results:

The attack DAG encompasses 41 different vulnerability exploits that hackers have exploited since the 1980s to compromise critical CPS and IoT frameworks. As mentioned earlier, every path from a head node to a leaf node in the attack DAG corresponds to a unique attack vector and further search of all such paths in the attack DAG revealed the existence of 10 unexploited attack vectors.

In the next phase of detecting novel vulnerabilities, various ML modules are used with different parameters and to determine the module that performs best. Modules such as SVM, K-nearest neighbors (K-NN), naive Bayes classifier, decision tree classifiers and regressors, and stochastic gradient descent (SGD) classifier are used. The accuracies, precision-recall values, False Positive Rates (FPR) and F1 scores of the different methods are compared. The results are shown in the table in FIG. 10. It is clear that SVM performs the best as the machine learning module.

Then SVM is used to predict the existence of new branches in the attack DAG. The SVM model successfully predicts the existence of 122 new feasible branches in the attack DAG. Each new branch corresponds to a novel vulnerability exploit.

Some of the 122 feasible branches of the attack DAG that were predicted by ML are listed in the table in FIG. 11. The exploits shown in FIG. 11 have been chosen to represent the predicted vulnerability exploits of every attack category.

Figures 12, 13:
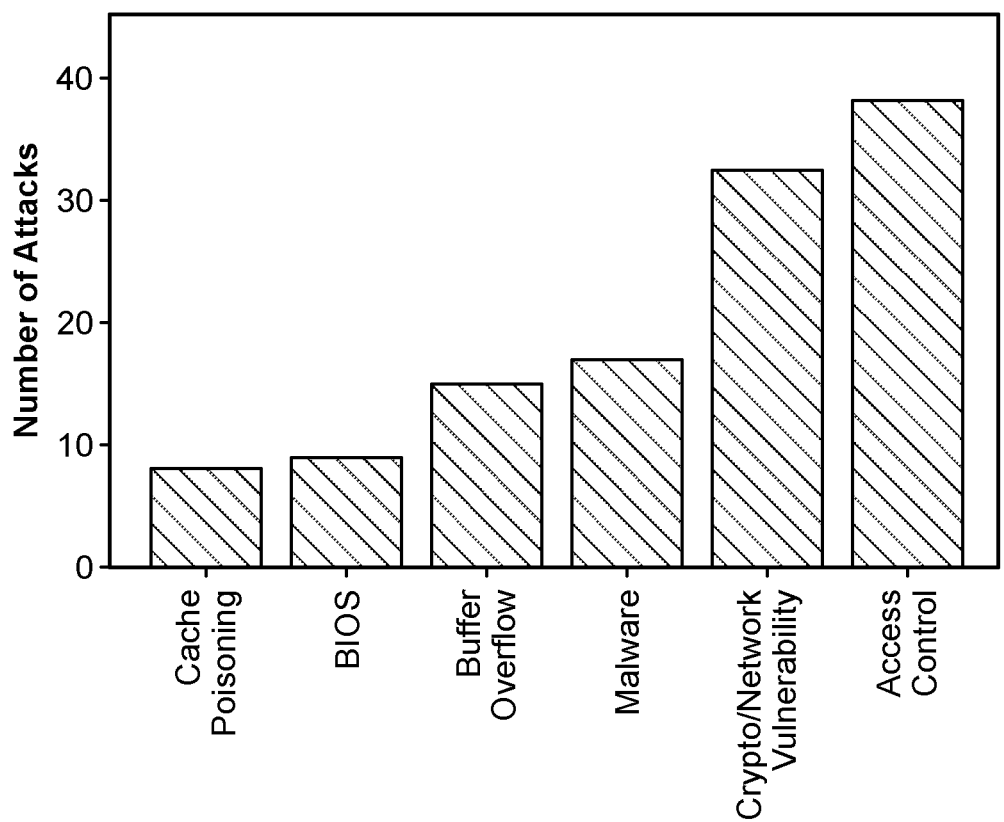
FIG. 12 depicts a table of a confusion matrix according to an embodiment of the present invention.
FIG. 13 depicts a histogram depicting a number of novel exploits in each category according to an embodiment of the present invention.

In the confusion matrix shown in the table in FIG. 12, the results are demonstrated in terms of true negatives (TN), false positives (FP), false negatives (FN), and true positives (TP). The hyperparameters of the SVM algorithm were chosen to maximize TN and TP and minimize FN and FP. The methodology achieves zero FN, which indicates that a negative prediction is always correct.

In FIG. 13, the 122 novel exploits are categorized into six categories. It is shown that access control vulnerabilities (including privilege escalation), weak cryptographic primitives, and network security flaws are the most susceptible to exploits. It is also observed that the least exploitable vulnerabilities are basic input/output system (BIOS) vulnerabilities and cache poisoning attacks. This is expected because a successful BIOS attack or a cache poisoning attack involves one or more of the following: boot-stage execution, shared resources with adversary, side-channel access, intricate complex procedures, and close proximity to the IoT devices at very specific time instances.

Security Measures 26: Construction of Defense DAGs

Once novel exploits have been predicted, defense DAGs are constructed at step 52 to defend an IoT system or CPS against prior known attacks and the predicted novel exploits. In this security measures section 26, the primary endeavor is to defend an IoT system or CPS against all known attacks and the novel exploits predicted at an optimal cost. Defense-in-depth and multi-level security (MLS) are the most appropriate schemes to adopt in such a scenario. Defense-in-depth refers to employing multiple defense strategies against a single weakness and is one of the seven properties of highly secure devices. MLS categorizes data/resources into one of the following security levels: Top Secret, Secret, Restricted, and Unclassified.

The top three levels have classified resources and require different levels of protection. The security measures become stricter when moving from Restricted to Top Secret.

The aggregated attack DAG includes multiple categories of attacks that are weaved together. These broad attack categories include but are not limited to buffer overflow attacks, access control and privilege escalation attacks, malware execution, cryptographic and network security flaws, and boot-stage attacks. Defense mechanisms can be systematically developed for each of these attack categories in the form of defense DAGs. Defense DAGs mirror the corresponding attack subgraphs and make execution of the key basic blocks of the attack sequence infeasible. This ensures that no path from a head node to a leaf node in the attack DAG can be traversed in the presence of the suggested defense measures.

Many attacks have multiple defense strategies that can protect against them. The more defense mechanisms that are enforced, the costlier the overall defense strategy becomes. MLS helps to optimize this cost. The less sensitive resources (those belonging to the Restricted level) have basic defense measures against all attacks. Moving up the hierarchy, the Secret and Top Secret levels have more layers of security. This ensures that securing the less sensitive resources is not as costly as securing the more sensitive resources.

Figure 14:
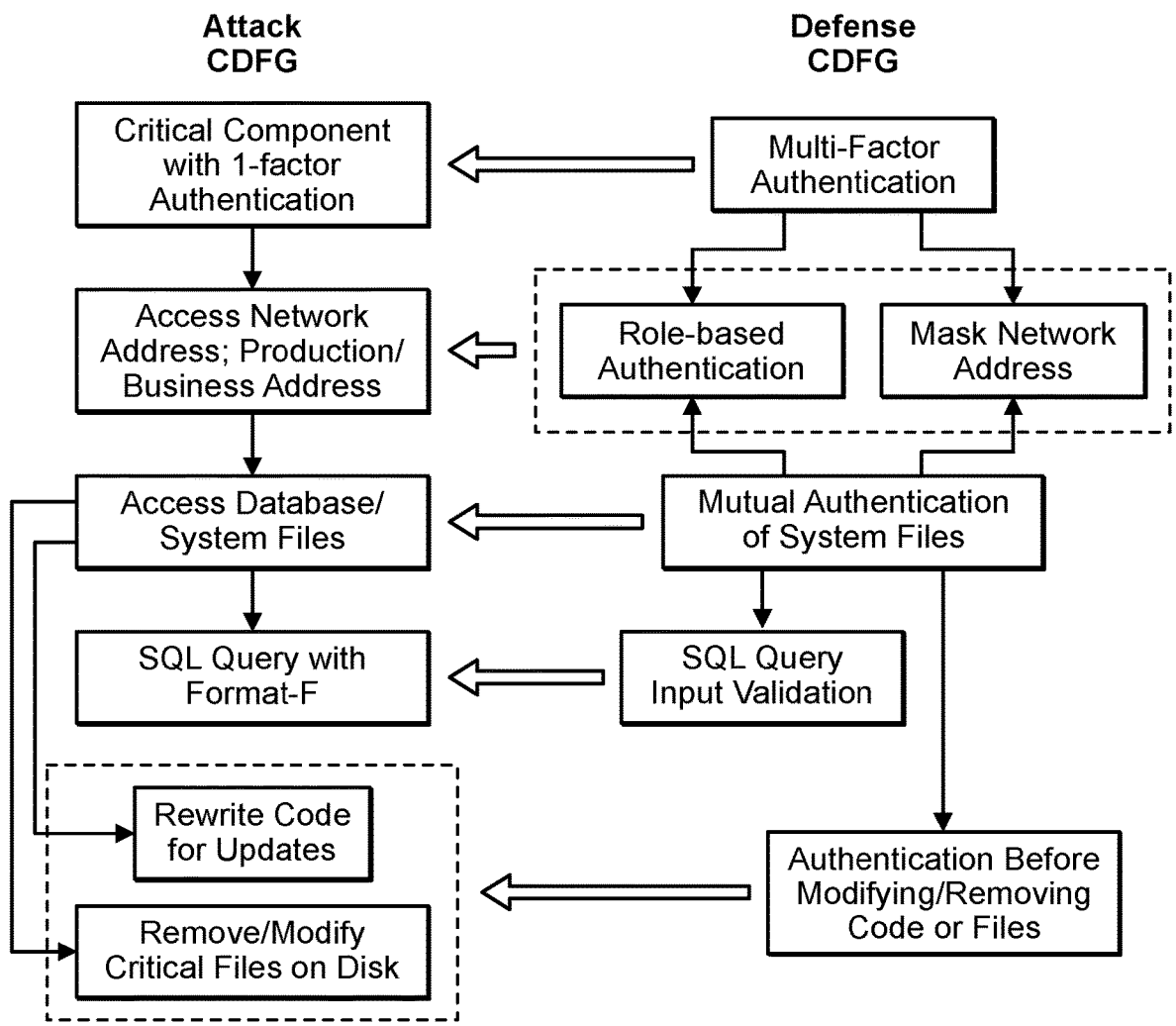
FIG. 14 depicts a graph of attack CDFG and corresponding defense CDFG according to an embodiment of the present invention.

The attack and defense mechanisms for access control and boot-stage attacks are described below. It is to be noted these are only examples and other defense mechanisms may be implemented as well in alternative embodiments. The diagram in FIG. 14 depicts how the defense DAGs (or defense CDFGs) reflect on the attack CDFGs and how various basic blocks of the defense CDFGs invalidate the execution of the corresponding basic blocks of the attack CDFGs. All the attack CDFGs in FIG. 14 are subgraphs of the aggregated attack DAG shown in FIGS. 6(a)-(b).

Defense against Access Control Attacks:

Access control and privilege escalation attacks are the most common amongst real-world IoT and CPS attacks, as shown in FIG. 13. Access control attacks involve an unauthorized entity gaining access to a classified resource, thus compromising its confidentiality and/or integrity. Privilege escalation attacks involve an entity exploiting a vulnerability to gain elevated access to resources that it is not permitted to access. Implementation of strong policies and advanced defense technologies can protect against such attacks. These security policies include multi-factor authentication, access control lists, role-based access control, and SQL queries input validation. More layers of authentication, authorization, and network masking can be added for more sensitive resources.

An example of a defense DAG is shown in FIG. 14. The CDFG on the left depicts the attack CDFG and the CDFG on the right depicts the defense CDFG. The arrows indicate the basic blocks of the defense CDFG making the corresponding basic blocks of the attack CDFG non-operational. Note that in FIG. 14, a boundary groups the basic blocks of the attack CFG that are shielded by the same basic block of the defense CDFG.

Defense Against Boot-Stage Attacks

This category of attacks is the most complicated among all the categories. While other attacks can be launched at the application level, these attacks have to be launched from the firmware, operating system (OS) or hypervisor levels.

Figure 15:
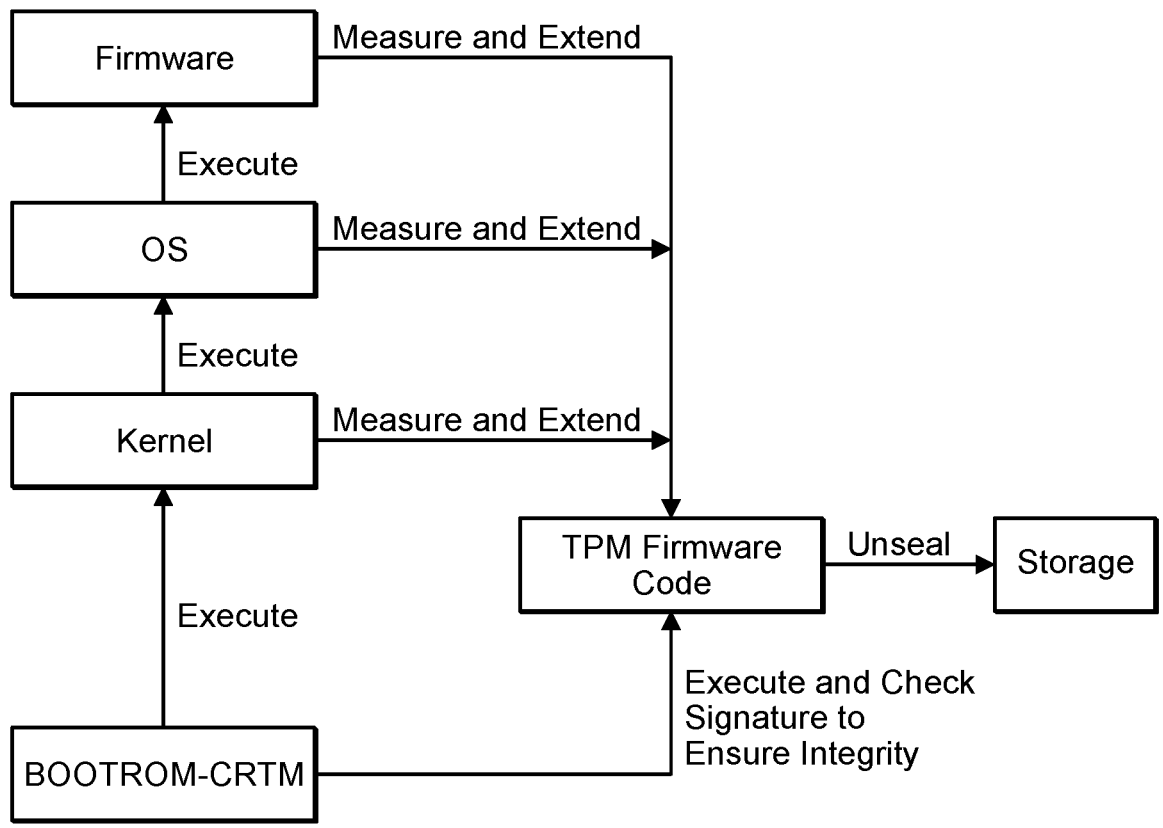
FIG. 15 depicts a flow chart of defensive measures against Boot-stage attacks according to an embodiment of the present invention.

To defend against such attacks, a Core Root of Trust for Measurement is required along with a Trusted Platform Module (TPM) or a Hardware Security Module. These are generally present at a level lower than the kernel and sometimes referred to as the Trusted Computing Base (TCB). In FIG. 15, the BOOTROM serves as the TCB. The defense procedure involves a series of hierarchical and chained hash checks of binary files and secret keys stored in the Platform Configuration Register (PCR) of the TPM. The PCR is inaccessible by all entities except the TPM. The detection of an incorrect hash value at any stage of the boot sequence causes the boot sequence to halt due to the detection of an illegal modification of the binary boot files and/or the secret(s). SHA-2 is the most commonly used hash function at this stage. FIG. 15 gives an overview of the hash checks and execution of binary files at various levels.

CONCLUSION

The disclosed vulnerability detection approach can be exploited in various other cybersecurity domains like network security and application security to detect vulnerabilities and novel exploits. The approach, as generally depicted in FIG. 2, remains unchanged but the attack DAG changes for the different applications. Depending on the specifications of the system and the threat model, a unique attack DAG can be derived for every system. Once the new attack DAG is constructed, the approach in FIG. 2 can be implemented for vulnerability analysis.

Another considerable advantage of this approach is that it is highly adaptable to the rapid progress of technology. With major advancements in technologies like 5G and ML, new attack strategies are highly plausible. The disclosed approach can be easily adapted to this modified attack scenario by vigilantly incrementing the attack DAG with the basic blocks of the new attack mechanisms.

As such, embodiments disclosed herein demonstrate how to use ML at the system and network levels to detect possible vulnerabilities across the hardware, software, and network stack of a given IoT and CPS framework. 122 novel exploits and 10 unexploited attack vectors were discovered in a generic CPS/IoT system using the disclosed method and appropriate defense measures were suggested to implement a tiered-security mechanism. It is projected that this system and method will be helpful in proactive threat detection and incident response in different types of CPS/IoT frameworks.

It is understood that the above-described embodiments are only illustrative of the application of the principles of the present invention. The present invention may be embodied in other specific forms without departing from its spirit or essential characteristics. All changes that come within the meaning and range of equivalency of the claims are to be embraced within their scope. Thus, while the present invention has been fully described above with particularity and detail in connection with what is presently deemed to be the most practical and preferred embodiment of the invention, it will be apparent to those of ordinary skill in the art that numerous modifications may be made without departing from the principles and concepts of the invention as set forth in the claims.

What is claimed is:

1. A method for detecting security vulnerabilities in at least one of cyber-physical systems (CPSs) and Internet of Things (IoT) devices, the method comprising:
    constructing an attack directed acyclic graph (DAG) from a plurality of regular expressions, each regular expression corresponding to control-data flow for a known CPS/IoT attack, the attack DAG comprising a plurality of nodes, each node representing a system-level operation of the CPS or IoT device, and a plurality of paths, each path representing a CPS/IoT attack vector;
    performing a linear search on the attack DAG to determine unexploited CPS/IoT attack vectors, wherein a path in the attack DAG that does not represent a known CPS/IoT attack vector represents an unexploited CPS/IoT attack vector;
    training a machine learning module to predict new CPS/IoT attacks;
    applying the trained machine learning module to the attack DAG to predict new CPS/IoT vulnerability exploits, the trained machine learning module configured to determine a feasibility of linking unconnected nodes in the attack DAG to create a new branch representing a new CPS/IoT vulnerability exploit;
    constructing a defense DAG configured to protect against the known CPS/IoT attacks, the unexploited CPS/IoT attacks, and the new CPS/IoT vulnerability exploits;
    wherein the machine learning module is trained based on parameters for achieving zero false negatives; and
    wherein the defense DAG is configured to mirror the attack DAG to make paths in the attack DAG infeasible.

2. The method of claim 1, wherein constructing the attack DAG further comprises representing each of the plurality of regular expressions as control-data flow graphs.

3. The method of claim 2, wherein constructing the attack DAG further comprises combining the plurality of control-data flow graphs into a single DAG.

4. The method of claim 1, wherein new CPS or IoT attacks are discovered based on a convergence of multiple paths at a common node in the attack DAG.

5. The method of claim 1, wherein linking unconnected nodes in the attack DAG is feasible when a sequence of operations represented by linking the unconnected nodes can be implemented in at least one of the CPS and IoT device.

6. The method of claim 1, wherein the machine learning module comprises a support vector machine (SVM) model.

7. The method of claim 1, further comprising constructing a training dataset for training the machine learning module, the training dataset comprising all existing paths in the attack DAG as feasible and a plurality of unconnected paths known to be infeasible.

8. The method of claim 7, wherein infeasible branches comprise infeasible sequences of system-level operations.

9. The method of claim 1, wherein the defense DAG is configured to protect against at least one of buffer overflow attacks, access control and privilege escalation attacks, malware execution, cryptographic and network security attacks, and boot-stage attacks.

10. A system for detecting security vulnerabilities in at least one of cyber-physical systems (CPSs) and Internet of Things (IoT) devices, the system comprising one or more processors couple to a memory, the one or more processors configured to:
construct an attack directed acyclic graph (DAG) from a plurality of regular expressions, each regular expression corresponding to control-data flow for a known CPS/IoT attack, the attack DAG comprising a plurality of nodes, each node representing a system-level operation of the CPS or IoT device, and a plurality of paths, each path representing a CPS/IoT attack vector;
perform a linear search on the attack DAG to determine unexploited CPS/IoT attacks vectors, wherein a path in the attack DAG that does not represent a known CPS/IoT attack vector represents an unexploited CPS/IoT attack vector;
training a machine learning module to predict new CPS/IoT attacks;
apply the trained machine learning module to the attack DAG to predict new CPS/IoT vulnerability exploits, the trained machine learning module configured to determine a feasibility of linking unconnected nodes in the attack DAG to create a new branch representing a new CPS/IoT vulnerability exploit;
construct a defense DAG to protect against the known CPS/IoT attacks, the unexploited CPS/IoT attacks, and the new CPS/IoT vulnerability exploits;
wherein the machine learning module is trained based on parameters for achieving zero false negatives; and
wherein the defense DAG is configured to mirror the attack DAG to make paths in the attack DAG infeasible.

11. The system of claim 10, wherein the one or more processors are further configured to represent each of the plurality of regular expressions as control-data flow graphs.

12. The system of claim 11, wherein the one or more processors are further configured to combine the plurality of control-data flow graphs into a single DAG.

13. The system of claim 10, wherein new CPS or IoT attacks are discovered based on a convergence of multiple paths at a common node in the attack DAG.

14. The system of claim 10, wherein linking unconnected nodes in the attack DAG is feasible when a sequence of operations represented by linking the unconnected nodes can be implemented in at least one of the CPS and IoT device.

15. The system of claim 10, wherein the machine learning module comprises a support vector machine (SVM) model.

16. The system of claim 10, wherein the one or more processors are further configured to construct a training dataset for training the machine learning module, the training dataset comprising all existing paths in the attack DAG as feasible and a plurality of unconnected paths known to be infeasible.

17. The system of claim 16, wherein infeasible branches comprise infeasible sequences of system-level operations.

18. The system of claim 10, wherein the defense DAG is configured to protect against at least one of buffer overflow attacks, access control and privilege escalation attacks, malware execution, cryptographic and network security attacks, and boot-stage attacks.

19. A non-transitory computer-readable medium having stored thereon a computer program for execution by a processor configured to perform a method for detecting security vulnerabilities in at least one of cyber-physical systems (CPSs) and Internet of Things (IoT) devices, the method comprising:
constructing an attack directed acyclic graph (DAG) from a plurality of regular expressions, each regular expression corresponding to control-data flow for a known CPS/IoT attack, the attack DAG comprising a plurality of nodes, each node representing a system-level operation of the CPS or IoT device, and a plurality of paths, each path representing a CPS/IoT attack vector;
performing a linear search on the attack DAG to determine unexploited CPS/IoT attack vectors, wherein a path in the attack DAG that does not represent a known CPS/IoT attack vector represents an unexploited CPS/IoT attack vector;
training a machine learning module to predict new CPS/IoT attacks;
applying the trained machine learning module to the attack DAG to predict new CPS/IoT vulnerability exploits, the trained machine learning module configured to determine a feasibility of linking unconnected nodes in the attack DAG to create a new branch representing a new CPS/IoT vulnerability exploit; and
constructing a defense DAG configured to protect against the known CPS/IoT attacks, the unexploited CPS/IoT attacks, and the new CPS/IoT vulnerability exploits;
wherein the machine learning module is trained based on parameters for achieving zero false negatives; and
wherein the defense DAG is configured to mirror the attack DAG to make paths in the attack DAG infeasible.

20. The non-transitory computer-readable medium of claim 19, wherein constructing the attack DAG further comprises representing each of the plurality of regular expressions as control-data flow graphs.

21. The non-transitory computer-readable medium of claim 20, wherein constructing the attack DAG further comprises combining the plurality of control-data flow graphs into a single DAG.

22. The non-transitory computer-readable medium of claim 19, wherein new CPS or IoT attacks are discovered based on a convergence of multiple paths at a common node in the attack DAG.

23. The non-transitory computer-readable medium of claim 19, wherein linking unconnected nodes in the attack DAG is feasible when a sequence of operations represented by linking the unconnected nodes can be implemented in at least one of the CPS and IoT device.

24. The non-transitory computer-readable medium of claim 19, wherein the machine learning module comprises a support vector machine (SVM) model.

25. The non-transitory computer-readable medium of claim 19, further comprising constructing a training dataset for training the machine learning module, the training dataset comprising all existing paths in the attack DAG as feasible and a plurality of unconnected paths known to be infeasible.

26. The non-transitory computer-readable medium of claim 25, wherein infeasible branches comprise infeasible sequences of system-level operations.

27. The non-transitory computer-readable medium of claim 19, wherein the defense DAG is configured to protect against at least one of buffer overflow attacks, access control and privilege escalation attacks, malware execution, cryptographic and network security attacks, and boot-stage attacks.

* * * * *